June 20, 1950 H. G. KENDALL 2,511,856

DEVICE FOR USING ADHESIVE TAPE

Filed Sept. 17, 1945 7 Sheets-Sheet 1

INVENTOR.
H. G. Kendall
BY George H. Fritzinger
ATTORNEY

INVENTOR.
H. G. Kendall
BY
George H. Fritzinger
ATTORNEY.

June 20, 1950 H. G. KENDALL 2,511,856

DEVICE FOR USING ADHESIVE TAPE

Filed Sept. 17, 1945 7 Sheets-Sheet 3

INVENTOR.
H. G. Kendall
BY George H. Fritzinger
ATTORNEY.

June 20, 1950 H. G. KENDALL 2,511,856

DEVICE FOR USING ADHESIVE TAPE

Filed Sept. 17, 1945 7 Sheets-Sheet 4

INVENTOR.
H. G. Kendall

BY George H. Fritzinger

ATTORNEY.

June 20, 1950 H. G. KENDALL 2,511,856

DEVICE FOR USING ADHESIVE TAPE

Filed Sept. 17, 1945 7 Sheets-Sheet 5

INVENTOR.
H. G. Kendall
BY George H. Fritzinger
ATTORNEY.

June 20, 1950 H. G. KENDALL 2,511,856

DEVICE FOR USING ADHESIVE TAPE

Filed Sept. 17, 1945 7 Sheets-Sheet 6

INVENTOR.
H. G. Kendall
BY George H. Fritzinger
ATTORNEY.

June 20, 1950 H. G. KENDALL 2,511,856

DEVICE FOR USING ADHESIVE TAPE

Filed Sept. 17, 1945 7 Sheets-Sheet 7

INVENTOR
H. G. Kendall
BY Geo. W. Fritzinger
ATTORNEY

Patented June 20, 1950

2,511,856

UNITED STATES PATENT OFFICE 2,511,856

DEVICE FOR USING ADHESIVE TAPE

Harold G. Kendall, Brooklyn, N. Y., assignor of one-half to George H. Fritzinger, West Orange, N. J.

Application September 17, 1945, Serial No. 616,785

35 Claims. (Cl. 216—29)

My invention relates particularly to devices for dispensing and/or applying adhesive tapes, and more especially to a manipulatable device for applying pressure-sensitive adhesive tape to objects as for packaging, reenforcing, sealing, affixing or other purposes. It will be understood, however, that many features of my invention are applicable generally to devices for using or working adhesive tape.

It is an object of my invention to provide a simple device that can be gripped and operated by the hand to dispense and apply pressure-sensitive tape to objects without requiring that contact be made with the tape by the hands.

It is another object to provide such a device which is adapted for applying any of a variety of tapes including heavy tapes, relatively wide tapes or laminated pressure-sensitive tapes, particularly those having the adhesive side covered along the central portion thereof and known in the trade as "riveting" tapes.

It is another object to provide a novel and improved device which is reliable and dependable for the purposes above stated.

It is another object of my invention to provide safeguarding means and arrangements in devices of the character mentioned which are adapted to prevent the user, when replacing a supply roll of tape, from installing the new roll in an incorrect position, and it is a further object in this respect to provide novel and improved mounting arrangements for the tape roll which are adapted to permit the roll to be inserted in only a correct relation to the tape-feeding means.

It is another object to control automatically the feeding of a starting length of tape and the severing of the applied tape from the tape supply roll by movement of the device across the object to which the tape is applied.

It is another object to provide such a device having novel and improved means for printing characters—for example, any desired trade name—on the adhesive side of the tape as the tape is drawn from the supply roll.

It is another object to provide a hand device which is adapted for applying tape around corners and edges of packages, cartons, or the like.

My tape applying device comprises a housing for a supply roll of adhesive tape in which there is provided a mechanism for feeding out a short length of tape, to serve as a starting length for application to an object upon setting the device thereon, and further including means for severing the tape from the supply roll. By way of example, one may use the device by setting it first on the object to which the tape is to be applied, then operating the feed mechanism to feed out a starting length of tape, next moving the device across the object to draw the tape from the supply roll and apply it progressively to the object, and thereafter severing the tape when a desired length has been applied.

A feature of my invention is to provide such a device wherein operation of a control in one direction causes the starting length to be fed out, and release of that control causes the tape which has been applied to the object to be severed from the supply roll.

Other objects and features of my invention lie in the details of construction, combinations of elements and arrangements of parts of the illustrative embodiment herein shown and will be apparent from the following description and appended claims.

In the description of my invention reference is had to the accompanying drawings of which:

Figures 1, 22, 23:
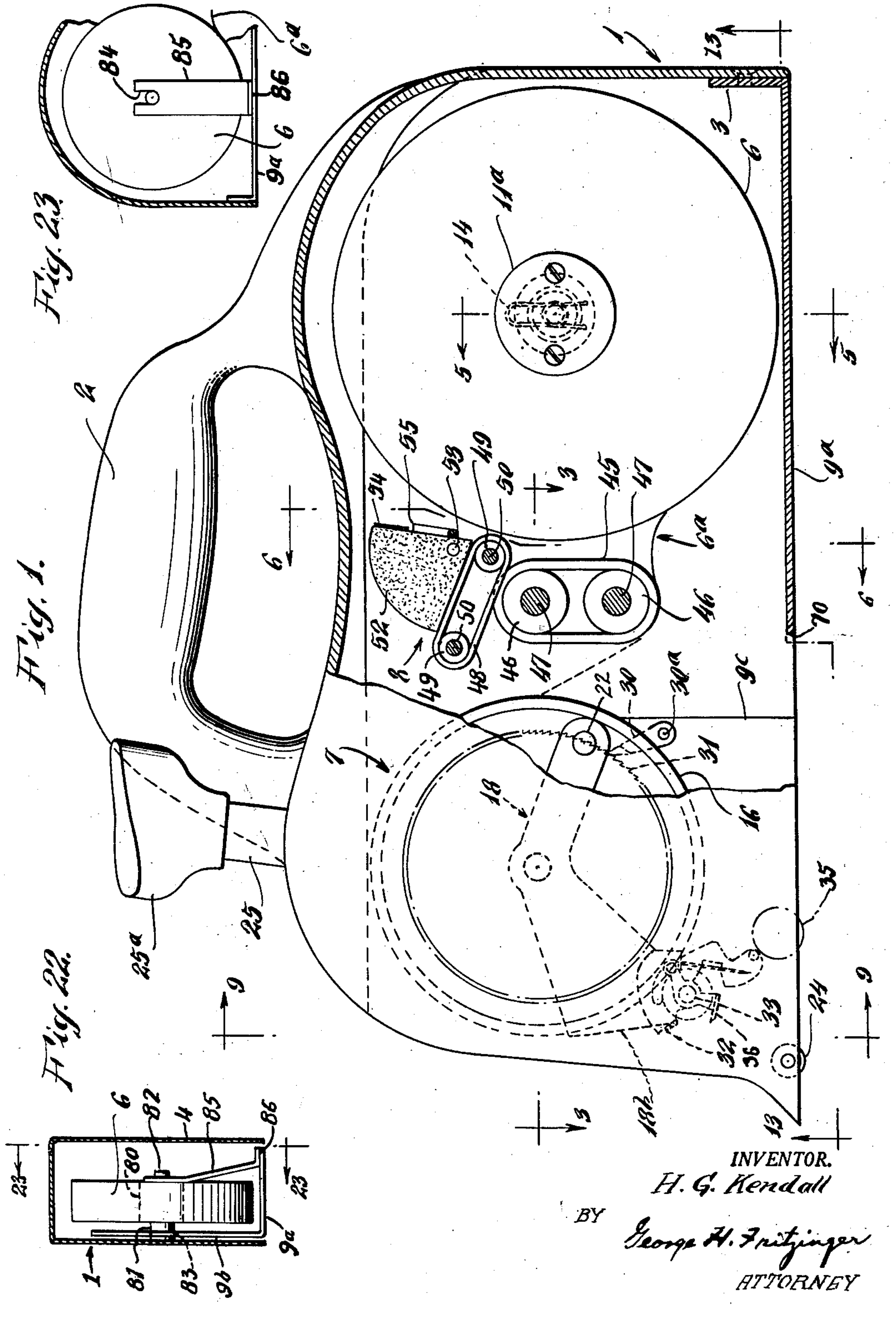
Figure 1 is a principally side elevational view, partly in section on the line 1—1 of Figure 13, of a tape applying device according to my invention, showing the tape-dispensing mechanism thereof in initial position.
Figures 5, 6, 7:
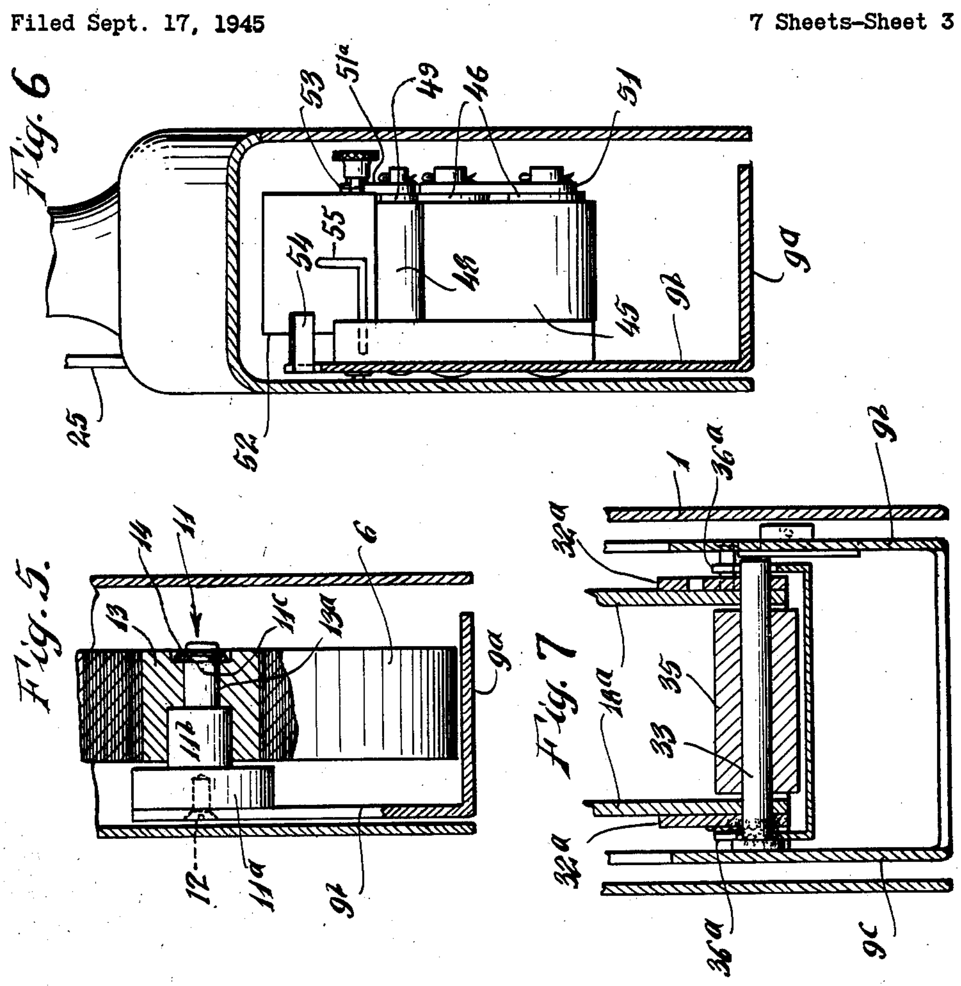
Figure 5 is a vertical section taken substantially on the line 5—5 of Figure 1.
Figure 6 is another vertical section taken on the line 6—6 of Figure 1.
Figure 7 is a fractional vertical section through the dispensing mechanism taken substantially on the line 7—7 of Figure 8.
Figure 4:
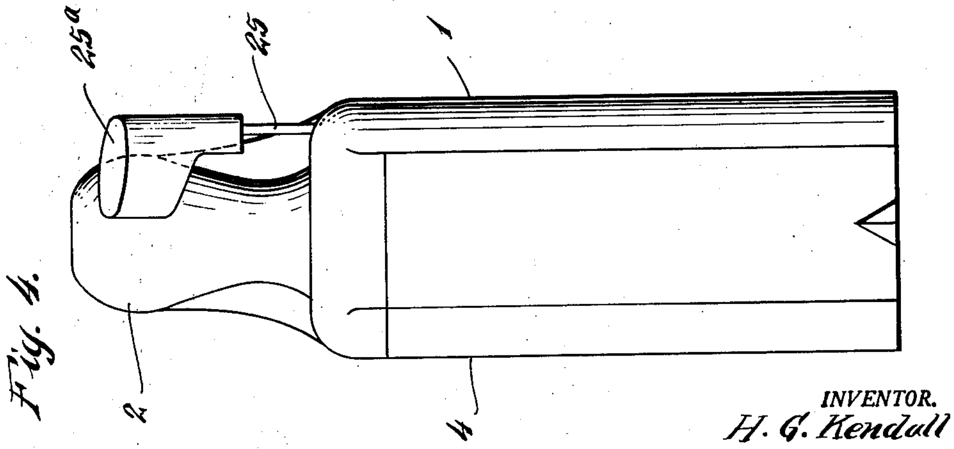
Figure 4 is a front elevational view of the device of Figure 1.
Figures 8, 9, 9A, 9B:
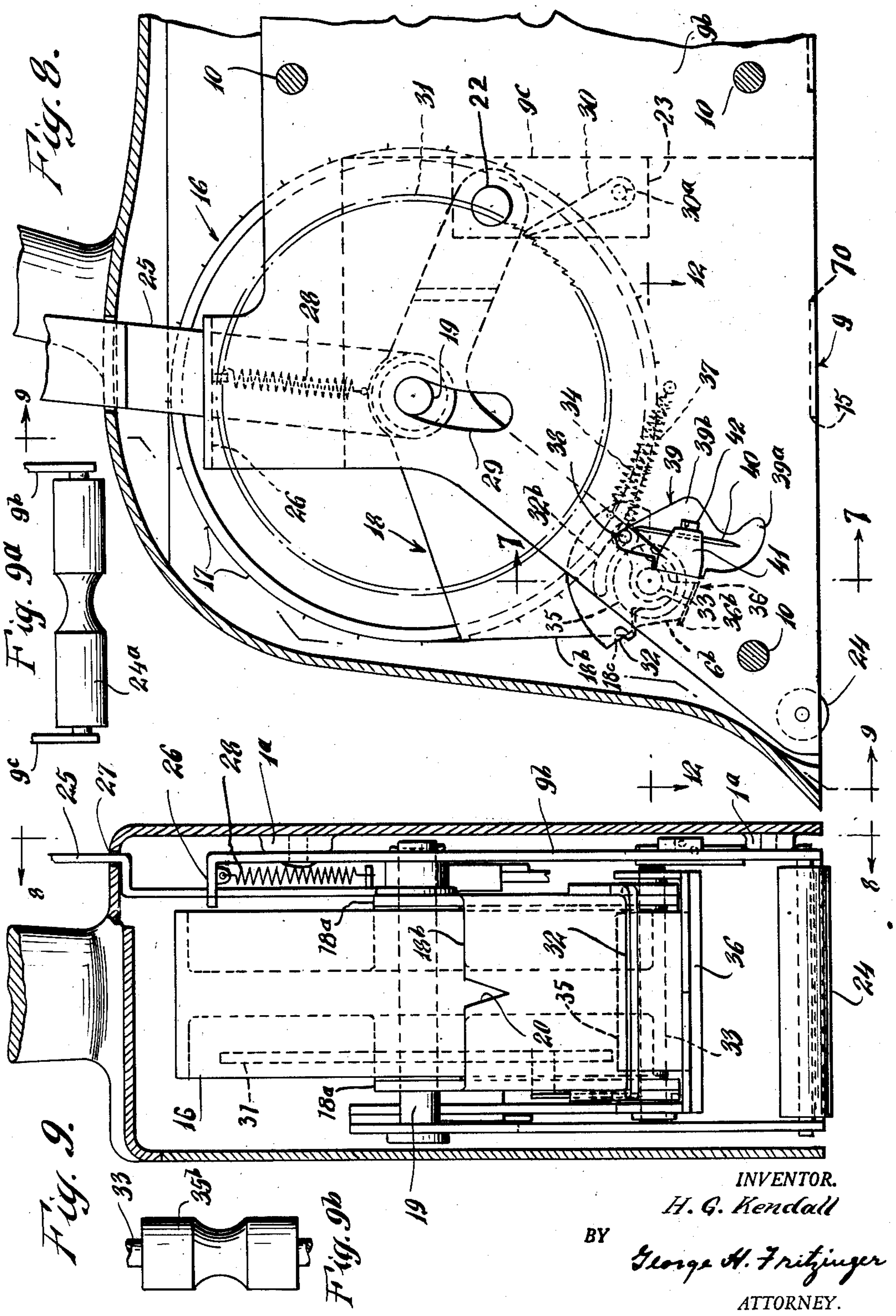
Figure 8 is an enlarged view taken on the line 8—8 of Figure 9, showing a side elevation of the dispensing mechanism in initial or unoperated position.
Figure 9 is a front view taken substantially on the lines 9—9 of Figure 8.
Figures 10, 11:
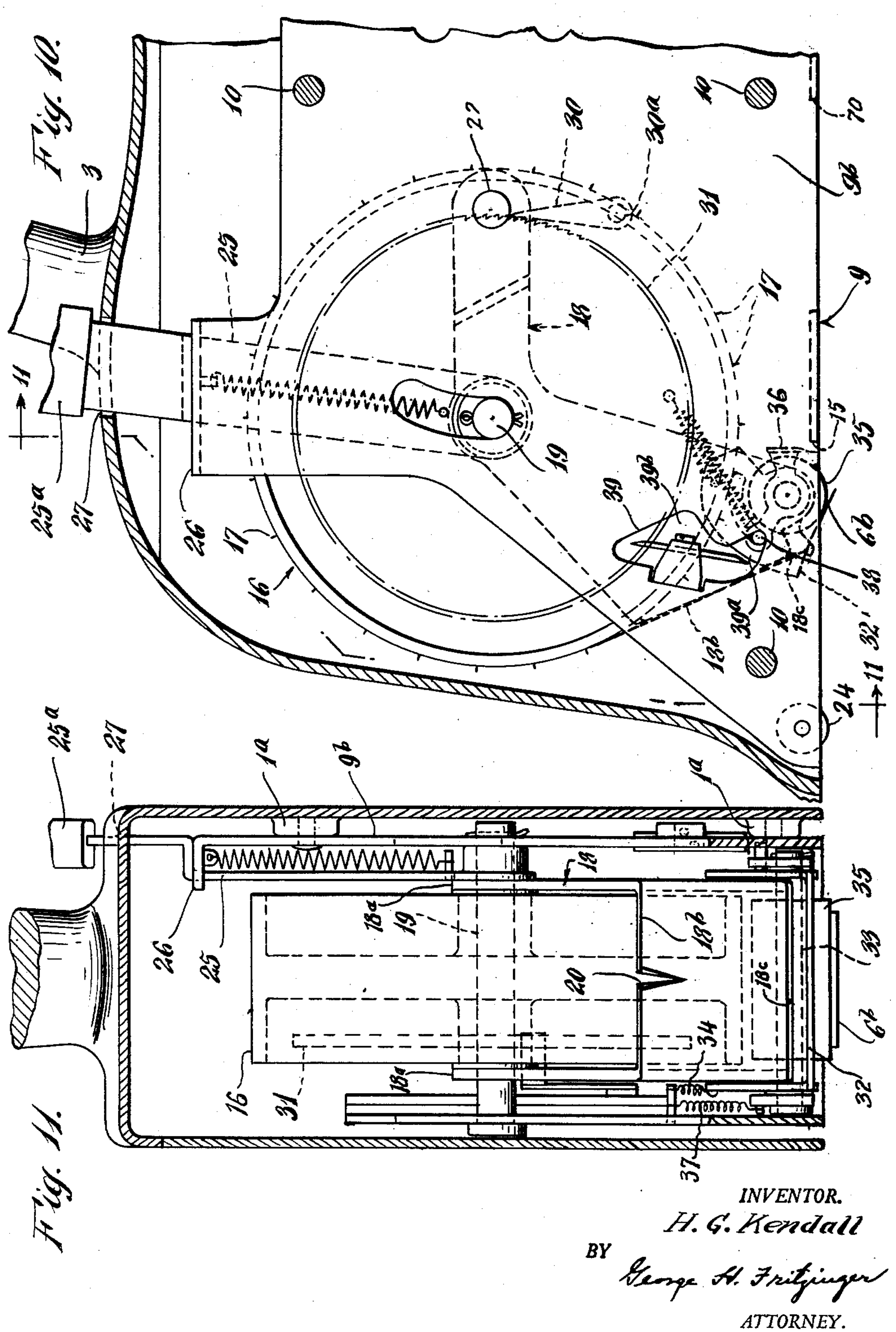
Figures 12, 13, 14, 15, 15A, 16, 17:
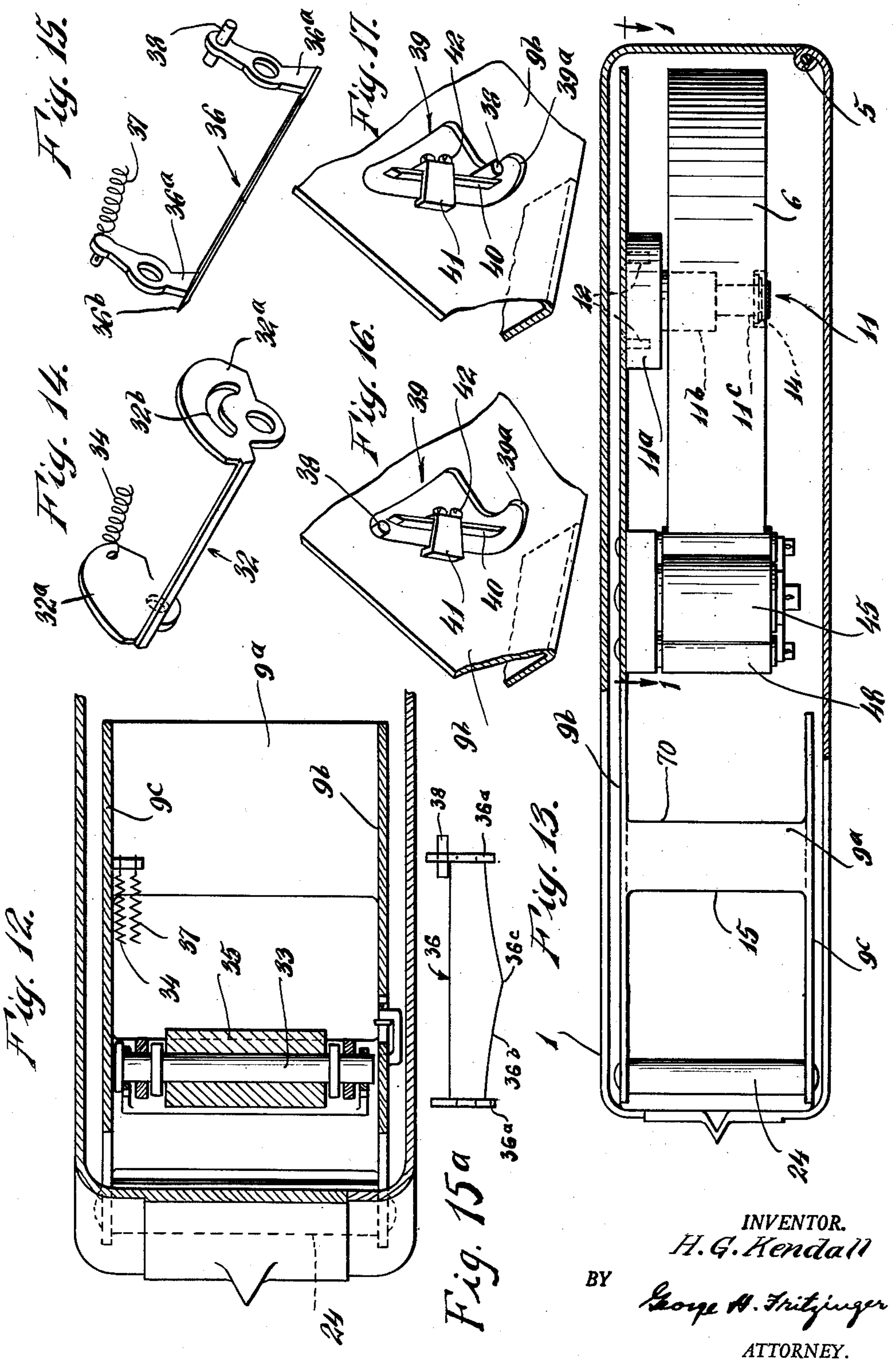
Figures 18, 19, 20, 21, 24:
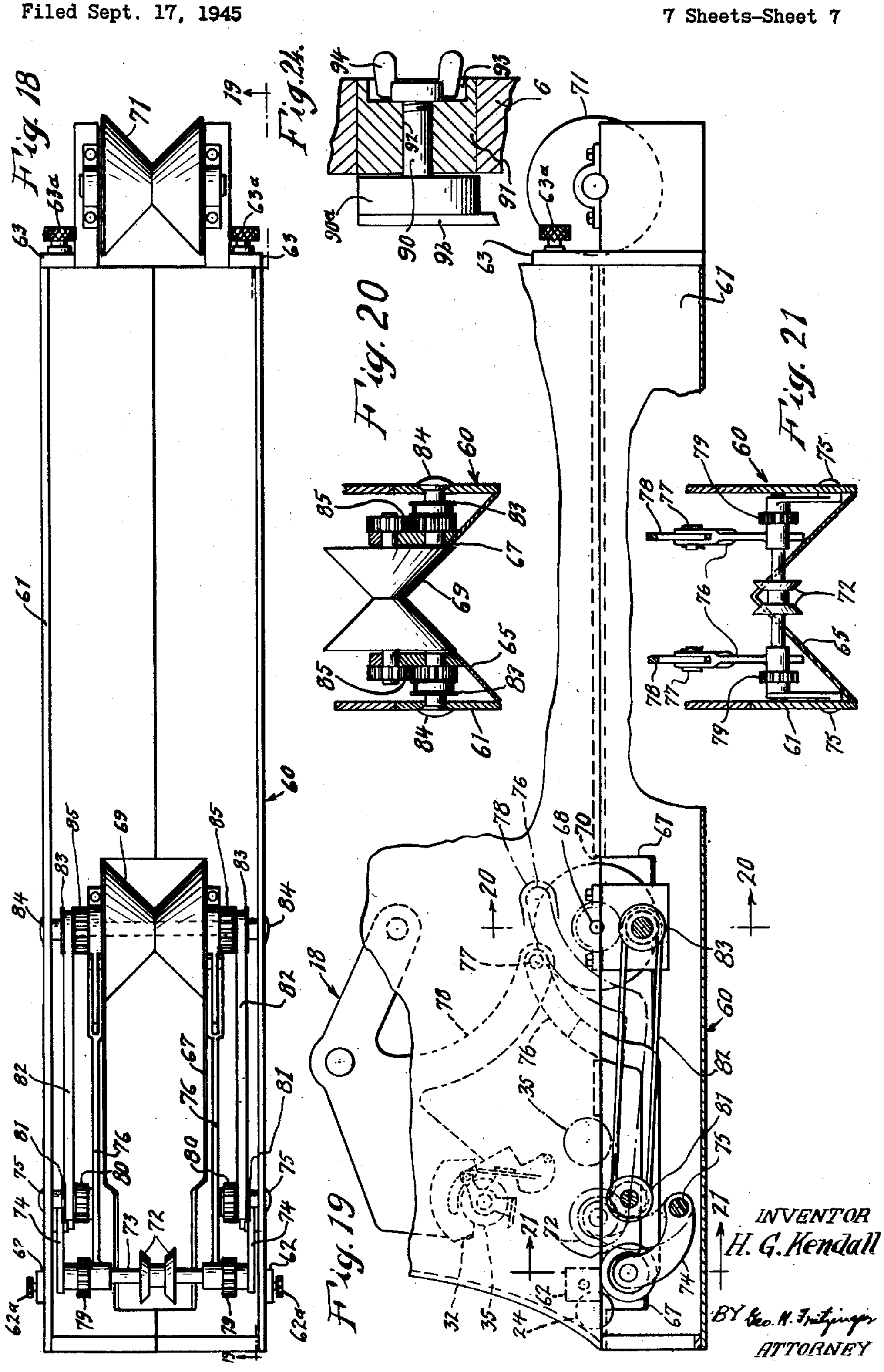

Figures 9*a* and 9*b* are fractional views illustrating a modification for adapting my device for applying "riveting" tape:

Figure 10 is a view similar to Figure 8 but showing the dispensing mechanism in an operated position:

Figure 11 is a front view taken on the line 11—11 of Figure 10:

Figure 12 is a fractional horizontal section taken on the line 12—12 of Figure 8:

Figure 13 is a fractional bottom view of my applying device taken substantially on the line 13—13 of Figure 1:

Figure 14 is a detailed view of tape-holding member of the tape feeding mechanism:

Figure 15 is a detailed view of the tape severing blade of the dispensing mechanism:

Figure 15a is a view af the blade as seen from the front of the device in Figure 10:

Figure 16 is a fractional view showing a cam of the dispensing mechanism with the element controlled thereby in the position it occupies when the dispensing mechanism is in initial position:

Figure 17 is a view similar to Figure 16 but showing the controlled element just mentioned in an intermediate position of its return stroke:

Figure 18 is a top plan view of an attachment with an automatic control adapting my device for applying tape along adjoining bounding surfaces at angles to one another:

Figure 19 is a section on the line 19—19 of Figure 18 showing the above-mentioned attachment secured to my applying device:

Figure 20 is a fractional sectional view taken substantially on the line 20—20 of Figure 19:

Figure 21 is a fractional section on the line 21—21 of Figure 19:

Figure 22 is a view to reduced scale and similar to Figure 5 but showing a second embodiment of tape-roll mounting according to my invention:

Figure 23 is a section on the line 23—23 of Figure 22:

Figure 24 is a fractional sectional view illustrating a third embodiment of tape-roll mounting arrangement.

Figure 2:
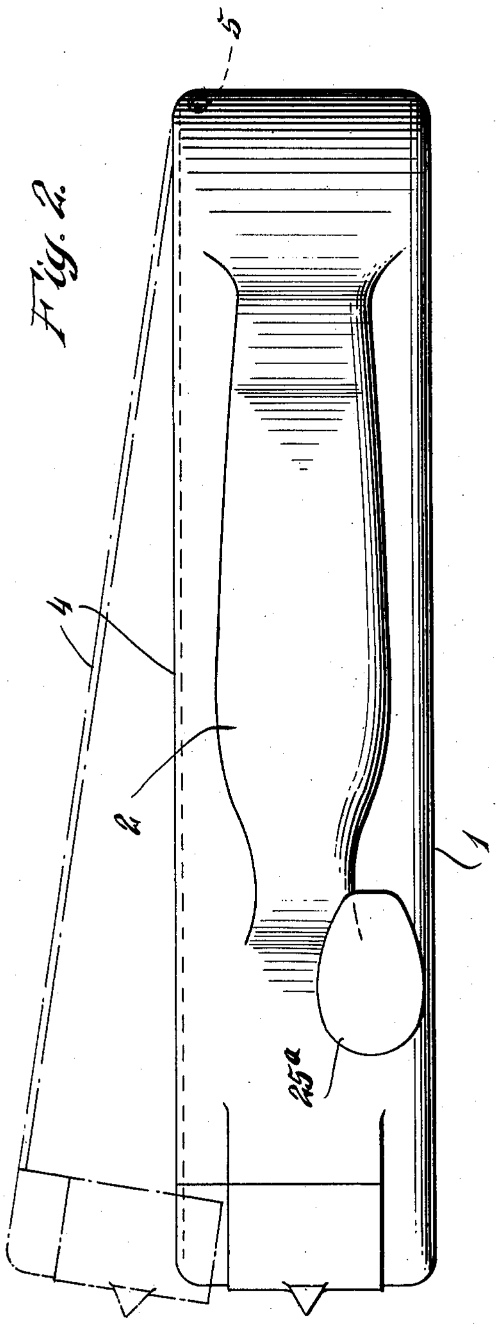
Figure 2 is a top plan view of this device showing a side door of the housing by dash dot lines in a partially open positon.

The preferred embodiment of my invention shown in the accompanying figures comprises a housing 1, formed for example of metal by die casting or of plastic by moulding, having a handle 2 at the top and the bottom thereof open. The housing has an openable side wall or door 4, which is hinged for example to the main housing as shown in Figure 2, to permit access to the internal mechanism and replacement of the tape supply. The tape supply is in the form of a roll 6 of pressure-sensitive tape, which is supported in the rearward portion of the housing. In the forward portion of the housing, there is a tape feeding and severing mechanism 7, herein referred to sometimes as the dispensing mechanism, and between the roll and dispensing mechanism, there is a tape printing mechanism 8. A metal frame 9 is provided in the housing which has a bottom side 9a substantially closing the bottom of the housing, a left vertical side wall 9b along the length of the housing adjacent the left side thereof (opposite the door 4) and a right vertical side wall 9c at the front of the housing only. (See Figures 1-3-8 and 10.) The left side 9b is secured by screws 10 to bosses 1a on the inner left wall of the housing (see Figures 3, 8 and 9) and is bracketed to the rear wall of the housing at 3 as shown in Figure 1.

One preferred mounting arrangement for the tape rolls comprises a shaft 11 (see Figures 5 and 13) having a mounting flange 11a at its base end held by screws 12 to the vertical frame wall 9b. This shaft has a tape-roll locating means at its base portion comprising preferably a shaft portion 11b of enlarged diameter. The roll has a core 13 provided with an axial opening 13a which is recessed at one end — i. e., in the present instance enlarged in diameter — so as to conform to the shaft and permit the roll to be mounted thereon in only one axially directed position relative thereto. The opening 13a is so axially directed with respect to the direction of the winding of the tape on the roll that as the tape is drawn from the roll towards the feed mechanism, while the roll is in a correct mounted position, the adhesive side of the tape faces in the desired direction. In the present embodiment, the free tape 6a is pulled forwardly from the roll as shown in Figure 1, and the roll is mounted so that the adhesive side of the tape 6a faces upwardly. The shaft 11 has a length such that when the roll is correctly placed thereon in a fully mounted position a free end portion of the shaft extends beyond the core. This extending portion has preferably a groove 11c adapted for receiving a spring clip 14 for retaining the roll on the shaft. This clip is preferably provided as a permanent part of the core 13 as shown, so that the roll can be attached in one manipulation of the hand without having to detach temporarily any parts that might become lost; also this retaining means always assures that each roll is located along the shaft in a correct position in relation to the feed mechanism.

The mounting above described is a unipositional one (with respect to the direction of the winding of the tape on the roll) which enforces the user, when replacing the tape roll 6, to install the new roll in correct relation to the tape-feeding mechanism. This is very important in machines using adhesive tape, especially pressure-sensitive tape, because a successful operation of the machine requires that the advesive side of the tape as it is drawn from the roll, be properly directed with respect to the machine. Certain advantages of the mounting above described are that it uses a very simple core having no elements extending beyond the sides of the roll. Although such a core is provided as a permanent part of each roll, it does not increase appreciably the cost of the roll nor does it require any larger carton for packaging the roll.

At the front of the applying device there is a roller 24 journalled to the frame sides 9b and 9c. This roller projects below the housing and provides a support for the device which tends to cause the device to roll straight when pushed across an object.

A starting length 6b of the tape is fed out through a bottom opening 15 of the frame 9, as illustrated in Figure 10, by a tape feeding mechanism which forms a component of the dispensing mechanism 7 aforementioned. The feeding mechanism comprises a wheel 16 having a series of sharply pointed pins 17 projecting from its periphery which engage the tape from the non-adhesive side and drivingly hold the tape to the wheel. (This pinwheel is described in my Patent No. 2,441,821, dated May 18, 1948.) The pinwheel lies between the arms 18a of a U-shaped lever 18 (see Figures 1 and 3) and is journalled on a shaft 19 which is supported at its ends by intermediate portions of the arms 18a. A part 18b of lever 18 bridges the arms 18a at the front of the pinwheel and is substantially tangential to the wheel. This part serves to strip the tape from the pins 17 as the wheel is turned, and is hereafter referred to as the stripping member. In this member there is a slit 20 for clearing it of the pins 17. The rearward portions of the arms 18a are offset at 21 away from one another so as to lie adjacent the frame sides 9b and 9c, and are pivoted to these sides by pins 22 supported at their inner ends by lugs 23 turned over from the framed sides. Connected to the shaft 19 is a control arm 25 which extends upwardly through a guide 26, turned over from the frame side 9b, and onwardly through an opening 27 in the housing 1. On the end of this arm there is a thumbpiece 25a which is at the left side of the handle 2 where it can be conveniently depressed by the thumb while the handle 2 is gripped with the right hand. The thumbpiece is normally held raised by a tension spring 28 connected between the arm 25 and guide 26. As the thumbpiece is depressed, the pinwheel 16 is rocked bodily downwardly about the pivot pins 22 as centers, and when the thumbpiece is released, the pinwheel is returned by the tension spring 28 to its initial position. The limiting positions of the pinwheel are defined, for example, by the abutment of the shaft 19 against the ends of slots 29 provided in the frame sides 9b and 9c.

Figure 3:
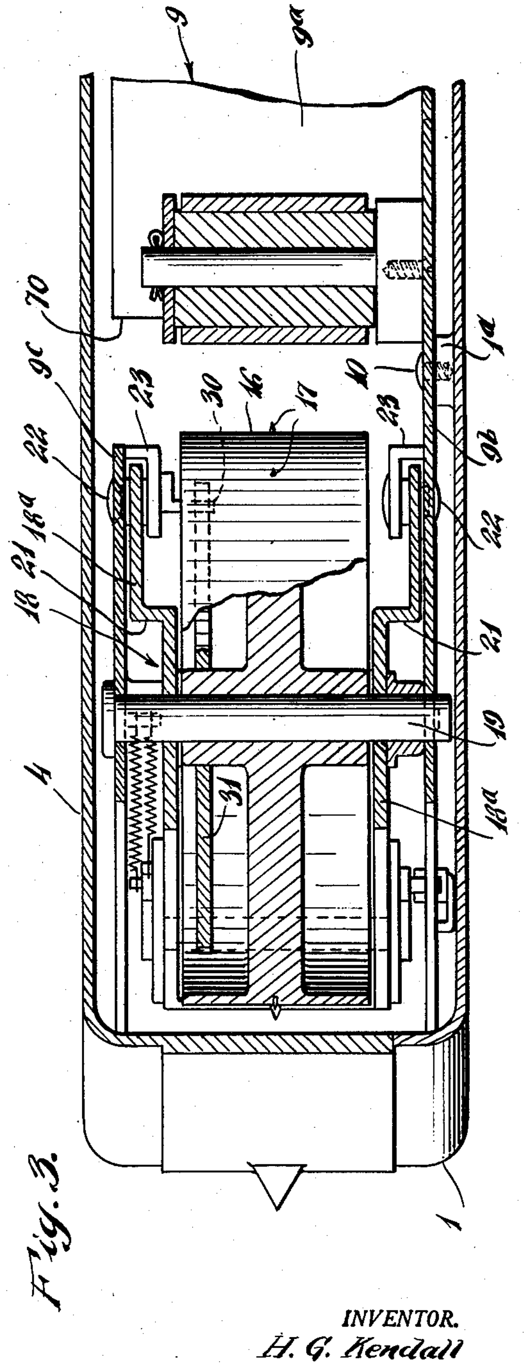
Figure 3 is a fractional horizontal section taken substantially on the line 3—3 of Figure 1.

As the pinwheel is moved bodily downwardly it is caused to rotate in a counterclockwise direction, as viewed in Figure 8, so that it will propel forwardly a starting length of tape. This rotation is produced by engagement of a pawl 30, which is pivoted at 30a to the right frame side 9c, with a ratchet wheel 31 mounted on the right side of the pinwheel, as shown in Figures 3 and 8. The length of tape which is so propelled forwardly is stripped from the pinwheel by the stripping member 18b and directed downwardly towards the opening 15 as is herein next explained.

At the lower end of the stripping member 18b there is a tape-holding member 32 having a flat narrow surface for contacting the adhesive side of the tape. This holding member is provided with side arms 32a which are secured to a shaft 33 that is pivoted to the arms of the lever 18. Under influence of a tension spring 34 the holding member is biased clockwise, as viewed in Figure 8, against the adhesive side of the tape to clamp the tape against a lower bevelled face 18c of the stripping member 18b, the place where the tape is so clamped being at a distance, say ½ inch, from the free end of the tape. During approximately the first two-thirds of the downward stroke of the control arm 25, the pinwheel 16 feeds forwardly a short slack length of tape above the holding member 32, while the latter continues to clamp the tape against the stripping member 18b. During the last one-third portion of the forward stroke, the pinwheel continues to feed forwardly the tape; however, the holding member is now cammed counterclockwise by a means hereinafter described, reaching finally the position it occupies in Figure 10. As the holding member leaves the stripping member, it holds to the tape by adhesive contact and serves to direct the starting length of tape (which is in advance thereof) through the opening 15. Also by its counterclockwise movement, it directs this starting tape into an oblique rearwardly-extending position wherein the adhesive side of the tape faces downwardly.

Journalled on the central portion of the rod 33 is a pressure roller 35. This roller is moved bodily downwardly with the pinwheel as the control arm 25 is depressed, and reaches a final position wherein it lies just above the starting length of tape 6b with a portion of the roller projecting through the opening 15 below the housing (as shown in Figure 10). The tape-contacting surface of the holding member 32 is substantially tangential to the roller 35 so that it will hold each starting length of tape adjacent to the roller. In the counterclockwise movement of the holding member, abovementioned, the starting length of tape is moved underneath the roller. An important feature of the present device is that this movement of the tape occurs before the roller reaches its downmost position. Thus, the thumbpiece 25a may be depressed before or after the device is seated onto an object and in either case a length of tape of approximately ¼ inch will be applied to the object.

Upon pushing the device forwardly across the object after applying the starting length of tape thereto, the tape is first pulled free from the holding member because the tape has substantially less area of contact with the holding member than it has with the object. (If it is desired that the tape disengage more easily from the holding member the tape contacting surface of the holding member is positioned so that as the tape is drawn around the roller 35 the adhesive side thereof is more than 180 degrees, instead of substantially 180 degrees as shown, from the adhesive side of the tape contacting the holding member.) Thereupon, with continued forward movement of the device the tape is caused to be drawn from the supply roll 6 around the pinwheel 16 and to be pulled out through the opening 15 and applied progressively to the object. When the desired length has been applied, the tape is severed adjacent to its point of exit from the housing by releasing the thumbpiece 25a as is herein next described.

The tape-severing means comprises a blade 36 shown in detail in Figure 15. This blade has two arms 36a pivoted on the outer ends of the shaft 33, the blade thus straddling the holding member 32 and being pivoted on a common axis with the holding member and pressure roller 35. The blade has a sharp razorlike edge 36b which may be inclined to its pivot axis; for some purposes it may also be desirable to have this edge serrated. The blade is urged clockwise under influence of a tension spring 37 connected between the right arm thereof and right frame wall 9c, and is controlled by coaction of a pin 38, which is in the left arm thereof, with a cam 39 provided in the left frame side 9b. This pin and cam also control the holding member 32, the pin being for this purpose extended rightwardly into engagement with an arcuate slot 32b provided in the left arm 32a of this member.

When the feed mechanism is in initial position, the left end of the pin 38 engages the uppermost part of the cam 39 and holds the blade 36 in a position underneath the roller 35 as shown in Figure 8. At this time the pin is in the rearward part of the slot 32b, and the holding member is clamped by means of the spring 34 against the stripping member 18b. Just back of the pin is a vertical leaf spring 40 which bridges the cam 39. This spring 40 is carried by a lug 41 which is turned leftwardly from the wall 9b at the front of the cam 39, then bent rearwardly and next inwardly at the center of the cam, the spring being held against the front face of this inner part of the lug by screws 42. During approximately the initial two-thirds portion of the downward stroke of the thumbpiece 25a, the pin 38 slides downwardly across the front face of the leaf spring 40 and turns the blade counterclockwise, and the inner part of the pin merely traverses from the rearward to the forward end of the slot 32b. During the final one-third portion of the downward stroke, the pin moves further downwardly across the leaf spring 40 to retract the blade into a rearward position indicated in Figure 10 and move the holding member counterclockwise as aforementioned. Near the end of the stroke the pin snaps off the lower end of the spring 40 but is yet retained in its same agular position relative to the roll 33 by engagement with an arcuate end portion 39a of the cam 39. During the initial one-third of the return stroke, which follows as an incident to releasing the thumbpiece 25a, the blade is held retracted and the holding member 32 is held in a counterclockwise position by the cam 39. During the next succeeding part of the return stroke, the pin 38 first moves underneath the lower end of the leaf spring 40, deflecting it some forwardly, and passes into an open part 39b of the cam 39. The pin is then no longer restrained and, as a result, the holding member 32 is returned into engagement with the stripping member 18b, again to clamp the tape, and thereafter the blade is snapped forwardly by the spring 37 through the path of the tape. In the normal operation of the applying device, the user releases the humbpiece while continuing to move the device forwardly across the object, thereby causing the tape from the stripping member to the pressure roller 25a to be held under tension. The sweep of the blade through this tensioned tape severs the tape, which has been dispensed, from the supply roll. But the user need only to urge the device forwardly with sufficient force to place the tape under a substantial tension as he releases the thumbpiece, for in every instance the tensioning force on the tape is brought to bear against the blade since the tape is clamped ahead of the blade by the holding member 32 before it is engaged by the blade. Also, the rate at which the user releases the thumbpiece is unimportant because regardless of the rate the blade is propelled forwardly with a snap movement. In the last portion of the return stroke, the pin 38 moves back through the free cam space 39b finally moving past the top end of the spring 40 and to the front thereof into its initial position above mentioned.

If the tape is not severed because the user fails to hold the tape under tension as he releases the tumbpiece 25a, the tape may yet be easily severed simply by tensioning it after the thumbpiece has been released for the blade now stands in the path of the tape and such tensioning will cause the tape to bear against the edge 36b and be severed.

In view of the blade moving in a forward upward direction the advance portion thereof comes into contact with the adhesive side of the starting length 6b as the tape is severed (Figure 8) and serves then to hold the starting length in its desired position while the device is idle. When that starting length is next fed out, the blade moves ahead of the tape and breaks contact therewith. Preferably I employ a blade 36 having an edge that is sharply pointed at its center 36c as shown in Figure 15a for such shape of blade facilitates the action just described to cause the starting length to be held more positively in position. Also, such a blade first punctures the tape to give a more positive cutting action, this being because pressure sensitive tapes are typically very weak in shear.

In a broader sense it will be understood that the oblique position in which the starting length 6b of tape is fed is a dispensing station or position from which strips of tape of varying length may be drawn by the hand as well as applied to an object. For example, upon depressing the thumbpiece 25a a length of tape is fed into this dispensing station or position where it can be gripped by the hand, and when a desired length of tape is drawn from the device the same is cut free from the tape supply by releasing the thumbpiece and continuing the pull on the tape.

It will be understood that the above described mechanism which I have provided for feeding out a starting length of tape will work positively with various kinds of tapes, including cellulose tapes, plastic tapes, fabric tapes, heavy wide tapes, and also so-called "riveting" tapes. For instance, the pinwheel 16 takes hold of the tape firmly and propels it from the roll as the wheel is turned. Preferably, I adjust the ratchet drive of the wheel so that the wheel will slightly overfeed the tape as the thumbpiece is depressed, and provide some slack in the tape above the holding member 32 before the holding member leaves clamping engagement with the stripping member 18b. There is then no tendency for the tape to be pulled loose from the holding member since the holding member need only have a sufficient grip on the tape to carry the starting length into the desired position; this it will do by adhesive contact even though a substantial width of the tape has no adhesive surface as is characteristic of the "riveting" tapes.

It is to be noted that the "riveting" tapes are used for holding rivets in structures before they are secured in place as in ship construction work. This is done by applying the tape across the head of each rivet. To adapt the present applying device for this purpose the pressure rollers 24 and 35 are made concave and referred to as 24a and 35b in Figures 9a and 9b respectively.

During the first one-third portion of the return stroke the tape will backfeed if it is not held taut ahead of the feed mechanism. Ordinarily, however, the tape will be held taut by its adherence to the object to which the tape has been applied, and a length of tape will be drawn from the roll, with the holding means 18c—32 being backfed along the tape, by the raising of the wheel 16 which occurs during this initial portion of the return stroke. This drawing of the tape occurs because the pivot 22, about which the wheel 16 and holding means 18c—32 are rocked, is located near a stationary place past which the tape is drawn from the roll 6, this place being the lower portion of the printing mechanism 8 (Figure 1). It is found from operation of the present machine that the tape so made available, by the backfeeding in one instance or by the drawing of the tape from the roll in the other instance as just explained, is sufficient as a starting length for a succeeding applying operation. Thus, the feed mechanism above described may be dispensed with and the machine will still be an operative one. However, the feed mechanism has the advantage of providing a slack length of available tape to permit a relatively long starting length to be applied to an object before it is necessary to draw tape from the supply roll. This assures a positive operation even though the machine is used on uneven surfaces, or used at very fast speeds or with tapes which are only partially coated with adhesive such as "riveting" tape. In the next succeeding portion of the return stroke the tape is severed ahead of the wheel 16 but before this severing occurs the tape is clamped to the stripping member 18b at a distance back from the severing means. By this clamping operation the free end portion of the tape is held fixed in relation to the wheel 16 throughout the remainder of the return stroke.

Since the pivot 22, about which the pinwheel is rocked, is located near a stationary place past which the tape is drawn from the roll 6, it will be understood that during the portion of the return stroke following the severing of the tape, there is no pull exerted on the tape to draw it from the roll nor is the tape between the pinwheel and the roll permitted to develop any appreciable slack. The pinwheel thus returns without any appreciable resistance on it. Also, by keeping the tape substantially taut against the pinwheel, there is no chance for the tape to become disengaged from the pinwheel or the printing mechanism.

While I have described the applying device as a hand operable one, it will be understood that my invention contemplates that such device may, alternatively, be power driven for automatic packaging.

The tape printing mechanism above referred to is located between the tape roll 6 and pinwheel 16 above the level of the tape 6a drawn from the roller as shown in Figure 1. This printing mechanism comprises a flexible printing band 45 which contacts the adhesive side of the tape 6a. This band is carried on a pair of vertically spaced rollers 46 that are journalled on shafts 47 supported by the frame side 9b. The rollers preferably are flanged for retaining the band thereon. The band is held under slight tension so that it can be readily removed and replaced by another as desired. On the outer surface of this band are raised characters for printing designs, written material, or the like, on the tape. Frictionally engaging the top portion of the printing band 45 is a band 48 having a roughened exterior surface. This band is supported in an upwardly inclined position on two rolls 49 which are journalled on shafts 50 and supported also from the frame side 9b. On the outer ends of the shafts 47 and 50 there are respective side plates 51 and 51a for holding the shafts firmly in their spaced relationship.

Slidably contacting the top surface of the band 48 is a printing material as of colored chalk in the form of a sector shaped cake 52. The cake rests on the band 48 but is held from falling out of position, should the device be tilted or inverted, by being pivoted at its lower rearward portion on a rod 53; this rod being supported by the left frame side 9b just above the rearward part of the band 48. Also, at the rear of the cake there is a stop 54 limiting its angular travel away from the band 48. Preferably, some slight tension of the cake of printing material against the band, in addition to that provided by its weight, is desired. This is done by a light spring 55 anchored suitably to the frame side 9b.

As the tape 6a is drawn from the roll 6, it is pulled against the lower portion of the printing band 45 and turns the band by its adhesive contact therewith. At the same time the band 45 frictionally drives the suply band 48 and causes the surface to slide across the bottom face of the cake 52. By this sliding contact the band 48 rubs off progressively a powder from the cake and carries the powder to the band 45, depositing the powder on the raised characters of the printing band. When these characters next engage the tape the adhesive on the tape picks up the powder and characters are printed on the tape. This printing mechanism works positively and is a very useful adjunct to tape dispensing and/or applying devices, especially as a means of advertising when used by stores in wrapping merchandise, etc.

In Figures 18 to 21, inclusive, there is shown an attachment 60 which incorporates means for operating the dispensing mechanism of the applying device automatically as the device is moved onto and off from an object and which moreover adapts the device for applying adhesive tape to adjoining bounding surfaces at angles to each other. This attachment includes a frame 61 which is adapted to fit the bottom side of the applying device along the length thereof. Near the front of the frame 61 there are upstanding brackets 62 which are secured to the housing of the applying device by thumbscrews 62a, and at the rear of the frame 61 there are two upstanding brackets 63 which are secured by screws 63a to the rearward part of the applying device.

The bottom wall of the frame 61 has a groove 65 running the full length thereof, the walls of which are typically at right angles to one another as shown. The front portion of the frame 61 has an opening 67 extending vertically therethrough. Pivoted at 68 to the frame 61, and engaging the rearward part of the opening 67, is a tape-applying roller 69 which lies just behind the starting length of tape that is fed from the applying device. This roller stands partially above the frame 61 and enters a clearance opening 70 in the bottom wall of the frame 9. At the bottom this roller projects just slightly below the groove 65 as shown in Figure 20. Preferably the peripheral walls of this roller are made of a yieldable material such as rubber and are placed at a slightly smaller angle to each other than is the angle between the adjoining surfaces to which the tape is to be applied, these walls of the roller being therefore slightly less than 90 degrees in the present embodiment. At the rear of the frame 61 there is a second such applying roller 71 which is provided so that when used for waterproof packaging, the tape will undergo a second application of pressure and thereby assure thorough bonding of the tape to the object in one motion.

At the front of the frame 61 there is a drive roller 72. This is a doubly bevelled roller secured to the central part of a transverse shaft 73. This shaft is journalled at its end to a pair of arms 74 which are pivotally secured at 75 to the sides of the frame 61. This drive roller is biased, as is hereinafter explained, into a downward position wherein it projects below the apex of the groove 65 and lies above and ahead the pivots 75. From this position the roller is movable rearwardly and inwardly with respect to the device. Thus the applying device may be moved across a corner onto an edge of an object or be seated vertically onto the object to cause, in either case, the drive roller to be pressed bodily inwardly into an operated positione by the seating pressure of the device on the object.

Pivoted to the end portions of the shaft 73 are two links 76 which extend upwardly into the housing of the applying device and connect pivotally, at 77, to two depending side arms 78 provided on the U-shaped lever 18 of the dispensing mechanism. These links operatively couple the drive roller to the dispensing mechanism and have the subsidiary function of guiding the shaft 73 in parallel motion. The lever 18 is biased upwardly as hereinbefore described, and by this biasing the drive roller is yieldably held in its downmost position. Upon seating the device onto an object and thereby pressing the drive roller inwardly, the lever 18 is swung counterclockwise to feed out a starting length of tape below the roller 35 in an oblique direction towards the grooved applying roller 69. This starting length is pressed against the edge of the object by the roller 35 and will be by its adhesion to the edge pulled free from the tape holding member 32 as the device is moved along the edge. Thereupon, with continued movement of the device along the edge, the tape is pressed into contact with the bounding surfaces adjoining that edge by the grooved applying roller 69, as hereinafter explained. When the front portion of the device is moved off the object the drive roller is released and the lever 18 is returned clockwise to initial position to sever the tape. Thus the drive roller serves as a control member which operates the dispensing mechanism automatically to feed a starting length of tape as the device is seated onto an object and to sever the tape as the device is removed from the object.

Secured to the end portions of the shaft 73 are two gears 79 which engage two stationarily pivoted gears 80 on the frame 61 when the drive roller is pressed into its inward operated position. These gears carry pulleys 81 which are coupled by belts 82 to a second pair of pulleys 83. These pulleys 83 are pivoted at 84 to the frame 61 and are coupled by gearing 25 to the applying roller 69. In the normal operation of the applying device, the device is moved across a corner of an object onto an edge thereof so as first to depress the drive roller and start it rolling along that edge. This couples the drive roller to the applying roller and begins spinning the latter. By this spinning movement the starting length of tape is turned or lapped downwardly into contact with the adjoining surfaces at that edge.

In Figures 22 and 23 I show a second embodiment of unipositional tape-roll mounting which enforces the user, when replacing a tape roll, to install the new roll in a correct position. In this mounting the roll 6 is provided with a core or arbor 80 having shaft extensions 81 and 82 of different diameters which are predeterminately directed with respect to the direction of the winding of the tape on the roll. One of these shaft extensions, say the extension 81 of larger diameter, is journalled at 83 in the side frame plate 9b, and the other shaft extension 82 seats in a slot 84 of a flexible upstanding leaf spring 85 which is secured at 86 to the bottom wall 9a of the frame 9. When the door 4 of the housing is open, the spring 85 may be gripped and sprung laterally to the side to permit an old roll to be removed and a new roll to be installed. When the spring is next released, it snaps back aginst the arbor to support the shaft extension 82 and to press the other shaft extension 81 against the housing of the applying device. This roll mounting has the advantage that it requires no parts that have to be removed in order to install a new roll and that it supports the roll in only one position without lateral play.

In Figure 24 I show a third embodiment of unipositional tape-roll mounting wherein a shaft 90 is provided with a mounting flange 90a secured to the frame side 9b. The roll 6 has a core 91 provided with an axial opening 92 to receive the shaft. The core and shaft have substantially equal axial lengths, but in the core there is a circular recess 93 which is at the outer end of the shaft when the roll is in correct position. This recess permits a roll-retaining means to be fastened to the shaft when the roll is correctly mounted. By way of example this retaining means is a wing nut 94.

I have herein shown and described certain preferred embodiments which are illustrative of my invention, but these embodiments may be changed and modified without departing from the scope of my invention, which I endeavour to express according to the following claims.

I claim:

1. A mechanism for feeding tape from a tape supply roll, comprising a wheel having tape-piercing pins for taking hold of the tape and propelling it from said roll, means for bodily moving said wheel, and means operatively coupled to said wheel for rotating the wheel as the same is bodily moved.

2. In a mechanism for feeding a length of adhesive tape from a tape roll into a dispensing station: the combination of a wheel having sharp pointed pins projecting from the periphery thereof for piercing the tape and propelling the same from said roll, means for bodily moving said wheel and concurrently moving the same in rotation, means for progressively stripping the tape from the wheel at an advance point therealong, and means operated upon moving said wheel for holding to the tape ahead of said wheel and guiding it to said station.

3. A mechanism for dispensing a length of pressure-sensitive adhesive tape, comprising a pinwheel for engaging the tape from the non-adhesive side and propelling the tape from a tape supply, means for moving said pinwheel, means for stripping the tape from said wheel at an advance point therealong as the wheel is moved, a member contacting the adhesive side of the tape ahead of said wheel and clamping the tape to said stripping member, and means operatively connected to said moving means for releasing said member from said stripping means and moving the member to carry the free end portion of the tape by adhesive contact to a dispensing station.

4. In a hand operable device for applying pressure-sensitive adhesive tape to objects, comprising a housing for a tape roll and having an opening through which the tape is projected: the combination of means in said housing for feeding tape from said roll including a guide member for releasably holding a leading portion of the tape at a distance back from the end thereof, and manually operable push means projecting from said housing means for controlling said feeding means to cause said guide member to direct the tape through said opening with the adhesive side of the end portion thereof of the tape facing away from said housing.

5. In a device for applying adhesive tape to objects upon movement of the device thereacross, including a housing and a tape roll in said housing: the combination of a member for pressing tape from said roll into contact with said object, said member being movable from a retracted position within said housing into an operative position wherein the member projects beyond the housing, and means operatively coupled with said pressing member for feeding a starting length of tape from said roll beneath said pressing member as the latter is moved into its said operative position.

6. In a device for dispensing adhesive tape, including a support for a tape roll: the combination of releasable clamping means for holding a leading portion of a free length of the tape in a dispensing position, a blade movable across the path of said tape ahead of said clamping means, and means operatively inter-connecting said clamping means and blade and actuatable to close said clamping means and thereupon to sweep said blade across the path of said tape whereby with tensioning of the tape ahead of the clamping means the tape is brought to bear against said blade and is severed.

7. In a hand device for applying pressure-sensitive tape to objects including a frame, a handle on said frame and a tape roll carried by said frame: the combination of a pressure roller for pressing tape into contact with an object, control means adjacent said handle for moving said roller into effective position and retracting the same, means for feeding a starting length of tape from said tape roll past the side of said pressure roller which faces outwardly from the housing as said roller is moved into effective position, and means controlled by said control means and operated during retraction of said roller for severing the tape.

8. In a device for applying pressure-sensitive adhesive tape to objects including a housing having an opening through which tape is to be fed, and a supply roll of tape in said housing: a mechanism for feeding a starting length of tape from said roll through said opening comprising a tape-feeding means including a releasable clamping member for engaging the tape, means for moving said feeding means transversely of said roll in an advance direction towards said opening and in a return direction to initial position, said feeding means being effective during movement in one of said directions to pull tape free from said roll, and means controlling said clamping member to release the same during the final portion of the advance movement of said feeding means and restore the same to effective condition during the initial portion of the return movement of the feeding means.

9. In a device for dispensing pressure-sensitive adhesive tape including means for carrying a supply roll of said tape: the combination of a tape-feeding mechanism, means mounting said mechanism for movement in advance and return directions, means included in said mechanism and effective upon advance mevement of the latter for drawing tape from said roll and projecting the free end portion of the tape into a dispensing position, and means for severing the tape at a point ahead of said feeding mechanism, said mounting means being adapted to guide said mechanism in a path to cause the tape between the mechanism and said roll to be held substantially taut after the tape is severed, without drawing any approciable length of tape from the roll, as said mechanism is returned.

10. A device for applying strips of adhesive tape along adjoining bounding surfaces of an object at angles to one another comprising a grooved applying roller for pressing the tape into contact with said bounding surfaces, means for feeding a starting length of tape from said device at a place in advance of said roller with respect to the direction of movement of the device across an object, and means for turning said roller to lap said starting length around the dividing edge of said surface.

11. A device for applying strips of adhesive tape along adjoining bounding surfaces of an object at angles to one another comprising a grooved applying roller for pressing the tape into contact with said bounding surfaces, means for feeding a starting length of tape from said device at a place in advance of said roller with respect to the direction of movement of the device across an object, and means adapted to engage at least one of said bounding surfaces ahead of said starting length as said device is moved across said bounding surfaces for initially spinning said roller to lap said starting length around the dividing edge of said surfaces.

12. A device for applying strips of adhesive tape along adjoining bounding surfaces of an object at angles to one another comprising a grooved applying roller for pressing the tape into contact with said bounding surfaces, means for feeding a starting length of tape from said device at a place in advance of said roller with respect to the direction of movement of the device across an object, a drive roller at the front of said device adapted for initially engaging said surfaces as the device is moved across a corner of said object onto said bounding surfaces, and means effective as said drive roller is turned for spinning said applying roller.

13. A device for applying strips of adhesive tape along adjoining bounding surfaces of an object at angles to one another, comprising a grooved side on said device adapted to be moved along said surfaces, a grooved tape-applying roller projecting from said side and spaced from the front end of the device respecting the direction of movement of the device across an object, means for feeding a starting length of tape out of said device ahead of said applying roller and in an oblique direction theretowards, and a roller at the front of said device adapted for initially engaging said object as the device is moved across an object for turning said applying roller to lap said starting length around the dividing edge of said surfaces.

14. A device for applying adhesive tape to objects comprising means actuatable to feed a starting length of tape out of said device, and a movable member coupled with said feeding means and projecting from the side of said device which faces an object when tape is applied thereto for automatically actuating said feeding means as an incident to placing the device on said object.

15. A device for dispensing adhesive tape from a supply roll and applying the tape to objects comprising a tape-supplying means on said device, a mechanism actuatable in one direction to feed a starting length of tape out of said device in advance of said applying means with respect to the direction of movement of the device across an object and actuatable in a reverse direction for causing the starting length of tape to be severed from said supply roll, a member projecting from said device at the front thereof and operatively coupled with said mechanism, said member being mounted for movement in an inward rearward direction and moved as an incident to placing the device on said object for automatically feeding out a starting length of tape, and means biasing said member into initial position for automatically operating said mechanism to sever said tape as the front portion of the device is moved from said object.

16. A device for applying strips of adhesive tape along adjoining bounding surfaces of an object at angles to one another, comprising a grooved applying roller for pressing tape into contact with said surfaces, a drive roller in a projecting position ahead of said applying roller and moved bodily inwardly with respect to said device upon seating the device onto an object, means actuated by said drive roller in response to said bodily inward movement thereof for feeding a starting length of tape out of said device at a place between said rollers, means operated by said drive roller upon rotation thereof for turning said applying roller to lap said starting length into contact with said surfaces, biasing means for returning said drive roller into a projecting position as the front portion of said device is moved from said object, and means responsive to said drive roller in the returning movement thereof for severing the dispensed tape from said supply roll.

17. In a device for applying adhesive tape to objects including a supply roll of adhesive tape and means for feeding out a starting length of tape from said roll: an attachment for adapting said device for applying tape along adjoining bounding surfaces of an object at angles to one another comprising a housing attachable to said device, a grooved applying roller carried by said housing for pressing the tape into contact with said surfaces, and means at the front of said housing, in respect of the direction of movement of the device across an object, and coupled with said applying roller for turning the latter to lap said starting length of tape around the dividing edge of said surfaces as the device is moved onto said surfaces at a corner of said object.

18. In a device for applying adhesive tape to objects including a housing and a support therein for a supply roll of said tape: the combination of a first means for feeding starting lengths of tape from said roll out of said housing, including a member for holding the tape at a distance from the free end thereof; a second means for severing the tape ahead of said member and for engaging the end portion of each starting length of tape to retain the same in a desired position between successive actuations of said first means; and means effective upon each actuation of said first means for releasing said second means from said tape.

19. In a device for applying pressure-sensitive tape to objects, including a housing and a support therein for a supply roll of said tape: the combination of means for feeding starting lengths of tape out of said housing from said roll; a blade operable to severe the tape drawn from said housing and to engage the adhesive side of the end portion of each starting length upon each severing operation whereby to retain each starting length in a desired position between successive actuations of said feeding means; and means, effective to move said blade in advance of each starting length upon each actuation of said feeding means, for pulling the blade free from the tape.

20. In a tape-dispensing device including a housing, a support therein for a supply roll of said tape and means for holding starting lengths of tape in a dispensing position to enable a user to draw off desired lengths from said roll: the combination of a blade having a sharply pointed edge and positioned out of the path of the tape drawn from said roll, and means coupled with said blade for projecting it into said path of the tape from said roll to cause the tape when tensioned to be first impaled and thereupon severed.

21. In a device for dispensing pressure-sensitive tape from a supply roll: the combination of a support for said roll; movably mounted means for holding a leading portion of a free length of said tape in a dispensing position; and reciprocable means controlling said holding means and effective when moved in one direction and upon the tape being held stationary at said dispensing position to cause a length of tape to be drawn from said supply roll and to cause thereupon the tape which is held at said station to be severed from the supply roll at a distance ahead of said holding means, the length of the tape which is so drawn from the supply roll being sufficient to allow a return of said reciprocable means without requiring any substantial retraction of the tape relative to said holding means whereby upon said return a starting length of tape is provided ahead of the holding means in said dispensing position.

22. In a device for dispensing lengths of pressure-sensitive tape from a supply roll: the combination of a support for said supply roll; means for holding a leading portion of a free length of said tape in a dispensing position; means for moving said holding means from said dispensing position and concurrently maintaining a substantially fixed length of tape between said holding means and said supply roll; and means cooperatively arranged with said holding means for severing the tape ahead of the holding means as the latter is moved from said dispensing position.

23. In a device for dispensing lengths of pressure-sensitive tape from a supply roll: the combination of a support for said roll; means for holding a leading portion of a free length of the tape in a dispensing position, said holding means being mounted for reciprocative movement to and from said dispensing position in a path transverse to a fixed plane through the axis of said supply roll; a movably mounted blade having a position wherein the blade is free from the tape drawn from said roll; and means coupled to said holding means and said blade for moving the holding means a distance from said dispensing position and thereupon projecting said blade into the path of the tape ahead of said holding means.

24. In a device for dispensing lengths of pressure-sensitive tape from a supply roll: the combination of a support for said roll; means for holding a leading portion of a free length of said tape in a dispensing position, said holding means being mounted for movement between a position wherein it holds the tape in said dispensing position and a position wherein the holding means is retracted from said dispensing position; feeding means coupled with said holding means for pulling a slack length of tape from said roll and providing the same back of said holding means as the holding means is moved to said dispensing position; and means cooperatively arranged with said holding means and operated as the latter is moved from said dispensing position for severing the tape at a distance ahead of the holding means.

25. In a device for dispensing lengths of tape from a supply roll: the combination of a support for said roll; means for holding a leading portion of the tape of said roll in a dispensing position, said holding means being mounted for movement from and to said dispensing position; means effective upon the tape being held at said dispensing position for backfeeding said holding means along the tape and for concurrently causing tape to be drawn from said roll; means for severing the tape ahead of said holding means; and means coupled to said severing means for rendering said severing means operable to cut the tape only when the holding means is retracted from said dispensing position.

26. A mechanism for feeding tape from a tape-supply roll, comprising a rotatably mounted tape-propelling means, actuatable means for bodily moving said tape-propelling means, and means operatively coupled to said propelling means for rotating the latter to draw tape from said roll as the propelling means is bodily moved.

27. The combination set forth in claim 26 including means coupled to said actuatable means and carried with said propelling means for engaging the tape ahead of said propelling means to direct the tape to a dispensing position.

28. In a device for dispensing tape from a supply roll: the combination of a support for said supply roll; means for engaging the tape drawn from said roll to hold a leading end portion of the tape in a dispensing position, said holding means being mounted for reciprocative movement from and to said dispensing position and being adapted to enable the tape to be drawn past the same from said supply roll; and means for retracting said holding means from said dispensing position in back-feeding relation to the tape and for concurrently drawing tape from said supply roll upon the tape being held stationary at said dispensing position.

29. In a device for dispensing tape from a supply roll: the combination of the support for said supply roll; means including a member contacting the adhesive side of the free tape drawn from said roll at a distance along the tape from the roll for holding a leading portion of the tape in a dispensing position, said means being movably mounted and having a range of movement away from and towards said dispensing position; means for moving said holding means away from said dispensing position; means effective upon said tape being held at said dispensing position and upon said moving means being actuated to move said holding means from said dispensing position to cause a length of tape to be drawn from said roll and to cause said holding means, when the same is in a retracted position, to be at substantially said distance along the tape from the roll; and means for returning said holding means and advancing the free tape towards said dispensing position.

30. In a device for applying lengths of tape to objects: the combination of a frame; a support on said frame for a supply roll of said tape; a member for pressing tape from said roll into contact with an object; means mounting said pressing member on said frame for movement from operative to inoperative positions, and vice versa; means for shifting said pressing member between its said positions; and means rendered effective upon actuating said shifting means to move said pressing member from operative to inoperative positions for severing the tape from said supply roll which has been drawn past said pressing member.

31. In a device for applying selected lengths of tape to objects: the combination of a frame; a support on said frame for a supply roll of said tape; a member for pressing tape from said roll into contact with an object; means mounting said pressing member on said frame for movement between operative and inoperative positions; means for shifting said pressing member between its said positions; and a cutting blade held out of the path of the tape as the tape is drawn past said pressing member while the pressing member is in its said operative position, said blade and pressing member being cooperatively arranged to cause the tape to be drawn against said blade and to be severed upon the tape being tensioned against said pressing member as said shifting means is operated to move said pressing member from operative to inoperative positions.

32. In a device for applying selected lengths of tape to objects: the combination of a housing having an opening; a support in said housing for a supply roll of said tape; a pressure roller for pressing tape from said roll into contact with an object; means mounting said pressure roller on said housing for movement between an operative position in said opening and a retracted-inoperative position within the housing; means for shifting said pressure roller between said positions; and a blade cooperatively arranged with said presure roller and rendered effective upon said shifting means being actuated to move said pressure roller from said operative to retracted positions for severing an applied length of tape from the tape supply.

33. In a device for applying selected lengths of tape to objects: the combination of a housing having an opening; a support in said housing for a supply roll of said tape; a movably mounted pressure roller on said housing for pressing tape from said roll into contact with an object, said pressure roller having an exposed-operative position at said opening and a retracted inoperative position within the housing; means for shifting said pressure roller between said positions and for concurrently maintaining a substantially fixed length of tape between it and said supply roll; and means including a blade cooperatively arranged with said pressure roller for severing engagement of the blade with the tape upon the pressure roller being shifted to inoperative position while the tape is tensioned thereagainst.

34. In a device for dispensing tape from a supply roll: the combination of a support for said supply roll; a housing for said support having an opening through which the tape is drawn from said roll as the tape is dispensed; means defining the path of the tape between said opening and said supply roll including shiftable holding means in said housing contacting the tape at a distance from the end thereof for presenting a free end portion of the tape in a dispensing position at said opening prior to a dispensing operation and for changing said path of the tape, said shiftable means being mounted for retracting movement from said dispensing position and said defining means being adapted to maintain substantially fixed in length the path of the tape between said shiftable means and said supply roll as said shiftable means is retracted; and means for operating said shiftable means away from and towards said dispensing position.

35. In a device for intermittently feeding lengths of tape from a supply roll: the combination of a frame; a support mounted on said frame for said supply roll; means for holding tape drawn from said roll in a predetermined position, said holding means being adapted to permit the tape to be drawn past the same from said roll and being mounted for reciprocative movement towards and away from said predetermined position and in relation to said support to cause the length of the tape between said supply roll and said position to be increased as the holding means is retracted from the latter whereby upon the tape being held stationary at said position a length of tape is drawn from said roll as said holding means is retracted; and means connected to said holding means for retracting the holding means from said position and for returning the holding means to advance the tape by the amount of said length to said position.

HAROLD G. KENDALL.

REFERENCES CITED

The following references are of record in the file of this patent:

UNITED STATES PATENTS

| Number | Name | Date |
|---|---|---|
| 414,403 | Grimes | Nov. 5, 1889 |
| 489,787 | Bowen | Jan. 10, 1893 |
| 969,973 | Nielsen et al. | Sept. 13, 1910 |
| 1,156,037 | Quigley | Oct. 5, 1915 |
| 1,177,528 | MacLaurin | Mar. 28, 1916 |
| 1,203,547 | Smith | Oct. 31, 1916 |
| 1,682,084 | Leopold | Aug. 28, 1928 |
| 1,969,947 | Rosener | Aug. 14, 1934 |
| 1,972,851 | McCarthy | Sept. 4, 1934 |
| 2,192,634 | Blomquist | Mar. 5, 1940 |
| 2,232,729 | Randolph | Feb. 25, 1941 |
| 2,236,993 | Crebbs | Apr. 1, 1941 |
| 2,260,489 | Sim | Oct. 28, 1941 |
| 2,333,108 | Krueger et al. | Nov. 2, 1943 |
| 2,334,689 | Wooster | Nov. 23, 1943 |
| 2,363,277 | Anderson | Nov. 21, 1944 |
| 2,365,477 | Krueger | Dec. 19, 1944 |